United States Patent
Chang et al.

[11] Patent Number: 5,545,496
[45] Date of Patent: Aug. 13, 1996

[54] PROCESS FOR PRODUCING FILAMENT-LIKE VANADIUM OXIDE FOR USE IN SOLID STATE RECHARGEABLE ELECTROCHEMICAL CELLS AND THE USE THEREOF AS A CATHODE IN ELECTROCHEMICAL CELLS

[76] Inventors: On-Kok Chang, 1031 Belvedere La., San Jose, Calif. 95129; M. Yazid Saidi, 492 Capitol Village Cir., San Jose, Calif. 95136

[21] Appl. No.: 271,341

[22] Filed: Jul. 6, 1994

[51] Int. Cl.⁶ .............. H01M 4/22; H01M 4/48
[52] U.S. Cl. .............. 429/218; 423/592; 252/518; 252/182.1; 29/623.1
[58] Field of Search .............. 29/623.1; 429/218; 423/592; 252/518, 182.1

[56] References Cited

U.S. PATENT DOCUMENTS

| | | | |
|---|---|---|---|
| 3,653,816 | 4/1972 | Mathers et al. | 23/19 V |
| 4,035,476 | 7/1977 | Ilmaier et al. | 423/592 |
| 4,303,748 | 12/1981 | Armand et al. | 429/192 |
| 4,486,400 | 12/1984 | Riley | 423/592 |
| 4,748,542 | 5/1988 | Lundsgaard | 361/433 |
| 4,792,504 | 12/1988 | Schwab et al. | 429/192 |
| 4,824,745 | 4/1989 | Ogawa et al. | 429/213 |
| 4,830,939 | 5/1989 | Lee et al. | 429/192 |
| 4,879,190 | 11/1989 | Lundsgaard | 429/94 |
| 4,935,317 | 6/1990 | Fauteux et al. | 429/192 |
| 4,990,413 | 2/1991 | Lee et al. | 429/191 |
| 4,997,732 | 3/1991 | Austin et al. | 429/153 |
| 5,037,712 | 8/1991 | Shackle et al. | 429/192 |
| 5,217,827 | 6/1993 | Fauteux et al. | 429/192 |
| 5,219,680 | 6/1993 | Fauteux | 429/191 |
| 5,229,225 | 7/1993 | Shackle | 429/191 |
| 5,262,254 | 11/1993 | Koksbang | 429/192 |

OTHER PUBLICATIONS

*CRC Handbook of Chemical & Physics*, 74th Ed., (D. R. Lide and H. P. R., Frederikse, Eds.). CRC Press, pp. 4–37 and 4–38 (1993).

Pryor et al., "Large Scale Preparation of Non–Stoichiometric $V_6O_{13}$, Preprint from the 16th International Power Source Symposium", pp. 1–15 (1988)*.

*Primary Examiner*—Kathryn Gorgos
*Attorney, Agent, or Firm*—Virginia Medlen

[57] ABSTRACT

The present invention provides a novel process for synthesizing vanadium oxide $V_6O_{13}$ with a filament-like morphology by thermally decomposing ammonium metavanadate $NH_4VO_3$ in the presence of a compound which sublimes upon heating. The reaction is carried out in an inert gas flow. The $V_6O_{13}$ synthesized according to this invention can be used as cathode active material in electrochemical batteries.

21 Claims, 3 Drawing Sheets

PROCESS FOR PRODUCING FILAMENT-LIKE VANADIUM OXIDE FOR USE IN SOLID STATE RECHARGEABLE ELECTROCHEMICAL CELLS AND THE USE THEREOF AS A CATHODE IN ELECTROCHEMICAL CELLS

TECHNICAL FIELD OF THE INVENTION

The present invention relates to the synthesis of vanadium oxide. More particularly, the present invention relates to the synthesis of $V_6O_{13}$ for use as cathode active material in a rechargeable electrochemical cell.

BACKGROUND OF THE INVENTION

Rechargeable batteries are widely used power sources, for example in calculators, computers, appliances and automobiles. Batteries consisting of solid state rechargeable electrochemical cells are of great interest because they allow important reductions in size and weight compared with the more traditional type of battery.

Solid state rechargeable electrochemical cells are well known in the art. Typically, these cells are constructed in layers composed of an alkali metal foil anode (negative electrode), an ionically conducting solid polymeric electrolyte separator, and a composite cathode (positive electrode). Terminals are attached to the anode and cathode thus forming an electrochemical cell. The cell may be sealed in a gas and liquid impervious packaging material from which the terminals protrude. There is no free flowing liquid in this type of cell. These solid state cells are of great commercial and technical interest. Use of solid state rechargeable electrochemical cells results in important weight reductions for example in automobiles, thus leading to improved automobile fuel efficiency.

Anodes suitable for use in solid electrochemical cells are usually formed from an alkali metal sheet or foil. Typically, the alkali metal of choice is lithium because of its low density and highly electropositive nature. See, e.g., U.S. Pat. No. 4,748,542 (Lundsgaard, 1988). The use of lithium-coated foil such as nickel or copper foil having a layer of lithium deposited on its surface, or the use of a lithium alloy is disclosed by U.S. Pat. No. 4,935,317 (Fauteux et al., 1990).

A solid ionically conducting electrolyte forms the separator between the cathode and the anode. Lundsgaard '542 teaches that the separator should be ionically conductive but electronically non-conductive. Typically, the separator comprises an ionically conductive polymer matrix similar to those described for use in the composite cathode. Most commonly, the separator is composed of a polymer such as polyethylene oxide and ionizable alkali metal salt in an aprotic solvent, see for example Fauteux '317. Alternately, the solid electrolyte separator may be composed of solvent ligands and polymer ligands coordinated with metal ions, see U.S. Pat. No. 5,229,225 (Shackle, 1993). A layer of solid electrolyte separator is deposited on the composite cathode layer, and is then polymerized.

Fauteux '317, discloses a typical composite cathode composition including active cathode materials such as transition metal chalcogenides or intercalation compounds, electronically conductive particles, an ionically conductive polymer matrix and a current collector. Representative examples of transition metal oxides and sulfides useful as active cathode materials are: $V_6O_{13}$, $V_2O_5$, $MoO_2$, $TiS_2$, $MnO_2$, $MoS_3$, $Cr_3O_6$, $Li_xV_3O_8$, FeS, NiS, CoO and CuO. Fauteux '317 discloses that $V_6O_{13}$ is a particularly preferred intercalation compound. Useful electronically conductive particles are: conductive carbon black particles and certain conductive polymers which are characterized by a conjugated network of double bonds (e.g., polypyrrole and polyacetylene). U.S. Pat. No. 4,303,748 (Armand et al., 1981) teaches the use of graphite to obtain electronic conductivity in the composite cathode.

The cathode intercalation compound and the electronically conductive particles are mixed with a monomer to form a paste which is polymerizable by radiation or heat to form a polymeric network. The polymer network serves to hold the solid particles; it also serves to provide ionic conductivity in the cathode. Ionic conductivity of the polymer matrix may be obtained by using an ionically conductive liquid which forms an interpenetrating conductive phase within a conductive or a non-conductive polymer matrix.

Conductive polymers are well known in the art. For example, U.S. Pat. No. 4,990,413 (Lee et al., 1991) discloses ionically conductive polymers suitable for cathode compositions. Lee '413 teaches that these polymers have repeating units containing at least one and preferably a plurality of heteroatoms particularly oxygen and/or nitrogen and which are preferably terminated by radiation polymerizable moieties. Solid electrolyte compositions comprising a polymeric network interpenetrated by an ionically conducting liquid phase are well known in the art, see e.g., the following U.S. Pat. No. 5,229,225 (Shackle, 1993); U.S. Pat. No. 5,037,712 (Shackle et al., 1991); U.S. Pat. No. 4,990,413 (Lee et al., 1991); U.S. Pat. No. 4,830,939 (Lee et al., 1989); and U.S. Pat. No. 4,792,504 (Schwab et al., 1988). Typically, these solid electrolyte compositions contain a solution of a conductive salt (such as certain lithium, sodium or potassium salts) in an aprotic solvent which forms a continuous phase in a crosslinked polymer such as polyethylene oxide.

The composite cathode is formed by depositing a layer of the mixture comprising intercalation compound and electronically conductive filler in ionically conductive monomer, on a current collector. The monomer is then heat or radiation polymerized, forming a bond with the current collector. Cathode current collectors are well known in the art, they typically comprise a metal foil. Fauteux '317 teaches the use of aluminum, nickel or stainless steel, and the process of forming the composite electrode.

As mentioned above, vanadium oxide $V_6O_{13}$ is commonly used as an intercalcation compound in cathodes of solid state rechargeable electrochemical cells, see for example U.S. Pat. No. 5,229,225 (Shackle, 1993); U.S. Pat. No. 5,219,680 (Fauteux, 1993); U.S. Pat. No. 5,217,827 (Fauteux, 1993); U.S. Pat. No. 5,037,712 (Shackle et al., 1991); U.S. Pat. No. 4,997,732 (Austin et al., 1991); U.S. Pat. No. 4,990,413 (Lee et al., 1991); U.S. Pat. No. 4,935,317 (Fauteux et al., 1990); and U.S. Pat. No. 4,830,939 (Lee et al., 1989).

Application of the anode to the electrolytic separator completes the laminar construction of a cell consisting of alternating layers of cathode, electrolytic separator and anode. Terminals are secured to the anode and the cathode to provide for electrical contact.

The synthesis of vanadium oxide $V_6O_{13}$ by thermal decomposition of ammonium vanadates is well known in the art. Examples of this synthesis are provided in U.S. Pat. No. 4,035,476 (Ilmaier et al., 1977) and U.S. Pat. No. 4,486,400 (Riley, 1984). Ilmaier '476 discloses a process for making $V_2O_x$, wherein X is between 3.8 and 4.6 (corresponding to $V_6O_{11.4-13.8}$), by thermally decomposing ammonium poly(hexa)vanadate at 600°–900° C. in the presence of an inert gas. The Ilmaier process results in a sintered product.

Riley '400 discloses the synthesis of $V_6O_{13}$ usable as the active material in cathodes used in high energy density cells. Riley decomposes ammonium metavanadate $NH_4VO_3$ by gradually heating $NH_4VO_3$ in a stepped process from 350° to 400° C. for about 6 hours, followed by heating at 400° to 500° C. over a period of 8–12 hours. The initial part of the heating is carried out in a nitrogen flow, followed by heating in a gaseous mixture having an oxygen partial pressure equal to the $V_6O_{13}$ oxygen partial pressure. Suitable gaseous mixtures are carbon monoxide/carbon dioxide and hydrogen/water vapor. Riley produces $V_6O_{13}$ having an average particle size of about 2 microns and a surface area of about 17 $m^2/g$.

Pryor et al., "Large Scale Preparation of Non-Stoichiometric $V_6O_{13}$," Preprint from the 16th International Power Source Symposium, 1988, discloses the effects of various processing conditions on the properties of $V_6O_{13}$ synthesized by thermal decomposition of $NH_4VO_3$ in an argon gas flow. Heating was carried out in a rotating drum furnace containing $NH_4VO_3$ and ceramic grinding media. The material was heated at a rate of 1.8° C./min. to a final temperature of about 427° C., it was then held at this temperature for four hours prior to cooling the product. Argon flow was continued throughout the heating and cooling process. Variations in reaction conditions resulted in $VO_x$ wherein the stoichiometric ratio X ranged from 2.18 to 2.24 (corresponding to $V_6O_{13.08-13.44}$). The BET surface area ranged from 10.0 to 14.6 $m^2/g$. Particles obtained by Pryor et al. (1988) consist of loosely bound agglomerates which may be reduced to single crystallites when dispersed with surfactant. "BET surface area" refers to the method developed by Brunnauer, Emmett, and Teller for calculating surface area based on gas adsorption. See, e.g., Martin, Swarbrick, and Cammarata, *Physical Pharmacy*, 3rd Edition, p. 508 (Lea & Febiger, Philadelphia, 1983). Pryor's Scanning Electron Microscopy ("SEM") data show $V_6O_{13}$ agglomerates.

The prior attempts to synthesize $V_6O_{13}$ have not produced a composition with a physical structure more nearly optimal for use in a composite cathode. Accordingly, the need exists for an improved $V_6O_{13}$ which, because of its physical shape or structure, has enhanced performance in rechargeable electrochemical cells thus leading to further reductions in cell weight and size.

SUMMARY OF THE INVENTION

The present invention provides a novel process for the synthesis of a novel form of vanadium oxide $V_6O_{13}$ for use in rechargeable electrochemical cells.

In one embodiment, the instant invention provides a novel process for preparing $V_6O_{13}$. The method includes preparing an intimate mixture of ammonium metavanadate $NH_4VO_3$ and a sublimation compound which sublimes during the thermal decomposition of $NH_4VO_3$. The reaction chamber is continuously purged by inert gas during heating and during the subsequent cooling. Thermal decomposition of $NH_4VO_3$ under these conditions results in the formation of $V_6O_{13}$ having filament-like morphology.

In another embodiment, the present invention provides a novel form of $V_6O_{13}$ prepared by the process of thermally decomposing $NH_4VO_3$ in the presence of a sublimation compound and inert gas. The novel form of $V_6O_{13}$ is characterized by a filament-like particle morphology.

In yet another embodiment, the instant invention provides a novel form of $V_6O_{13}$ characterized by a filament-like morphology.

In a further embodiment, the present invention provides a composite cathode which incorporates the novel form of $V_6O_{13}$ in a conductive polymer network.

In yet a further embodiment, the present invention provides improved solid state rechargeable electrochemical cells. A cell of this embodiment includes a composite cathode which incorporates the novel form of $V_6O_{13}$ in a conductive polymer network.

DETAILED DESCRIPTION OF THE INVENTION

Figure 1:
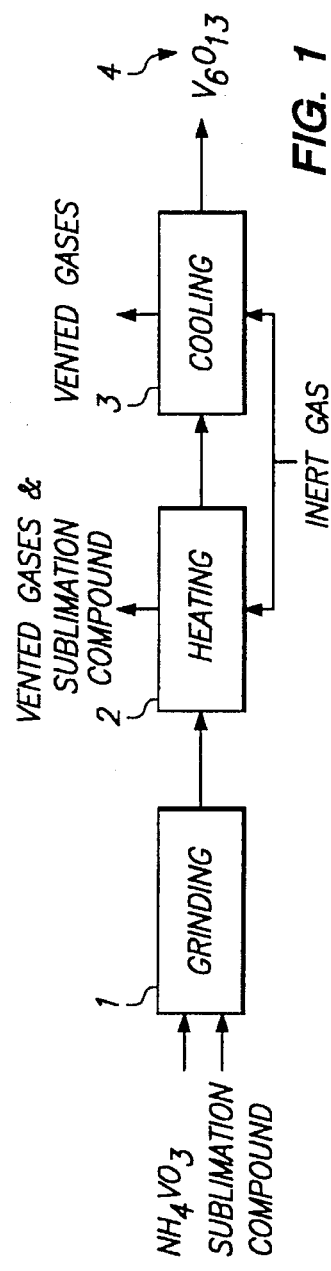
FIG. 1 is a flow sheet illustrating the process for making the novel filament-like form of $V_6O_{13}$.

While describing the invention and its embodiments, certain terminology will be utilized for the sake of clarity. It is intended that such terminology include not only the recited embodiments, but all technical equivalents which perform substantially the same function, in substantially the same manner to achieve substantially the same result.

Definitions

The term "battery" may include a single cell, or a plurality of cells connected in either series or parallel fashion to furnish electrical current.

The term "cell" includes an anode layer, an electrolyte layer, a cathode layer and electrically conductive terminals connected to the anode and the cathode; included are cells consisting of a plurality of these layers connected in bifaced, bipolar, or other cell configurations known in the art.

The term "sublimation compound" includes any chemical compound which sublimes upon heating.

The term "solid state" includes polymeric compositions containing a liquid interpenetrating network, substantially without free flowing liquid.

I. Process for Synthesizing Novel Filament-Like $V_6O_{13}$

Ammonium metavanadate $NH_4VO_3$, sublimation compound and inert gas are used in the process for synthesizing novel $V_6O_{13}$. Commercial grades of $NH_4VO_3$ are available.

Alternatively, $NH_4VO_3$ may be synthesized according to the method disclosed in U.S. Pat. No. 3,653,816 (Mathers et al., 1972).

Commercially available inert gases such as nitrogen, helium and argon, can be used in the process for synthesizing novel $V_6O_{13}$. Inert gas is used to provide reaction conditions which are substantially free of oxygen and to remove reaction by-products and sublimation compound, thereby favoring the formation of $V_6O_{13}$.

The use of a sublimation compound is essential to the present invention. While not limiting the invention to the following explanation, it is believed that the unexpected benefits arising from the use of sublimation compound are due to physical rather than chemical effects. It is thought that the use of sublimation compound creates favorable conditions for the formation of filament-like crystals of $V_6O_{13}$ by separating the $NH_4VO_3$ particles during thermal decomposition. The final product is not contaminated with, nor has it reacted with, the sublimation compound since this is substantially removed by sublimation during decomposition of $NH_4VO_3$.

Thermal gravimetric analysis (TGA) shows that thermal decomposition of $NH_4VO_3$ starts at a temperature of approximately 130° C., see Pryor et al., 1988. Accordingly, sublimation compounds effective for the present invention are those which show a significant sublimation at temperatures ranging from approximately 130° C. through the full heating range for decomposition of $NH_4VO_3$. Suitable sublimation compounds are compounds with a sublimation temperatures of 130°–550° C, preferred sublimation compounds have sublimation temperatures of 160°–335° C. Particularly preferred sublimation compounds are ammonium benzoate and ammonium chloride, with sublimation temperatures of 160° and 340° C., respectively, (See, e.g., CRC Handbook of Chemistry & Physics, CRC Press, 74th Edition pp. 4–37 and 4–38, 1993). Other suitable sublimation compounds include, for example, ammonium bromide, ammonium acetate, ammonium propionate, and ammonium formate.

The weight ratio of $NH_4VO_3$/sublimation compound is not critical, it may range from about 1/9 to about 9/1, more preferably from about 4/6 to about 6/4. Most preferably, the weight ratio of $NH_4VO_3$/sublimation compound is about 1/1.

The process for synthesizing novel $V_6O_{13}$ according to the present invention is illustrated in FIG. 1, wherein each number denotes a specific processing step. In step 1, $NH_4VO_3$ and sublimation compound are ground together to reduce the particle size of the powders and to achieve an intimate blend of $NH_4VO_3$ and sublimation compound. Conventional grinding equipment, such as, for example, mortar and pestle, ball mill, hammer mill, attrition mill and mix muller, is suitable for step 1.

While the preferred method of achieving an intimate mixture of $NH_4VO_3$ and sublimation compound consists of grinding, other methods known to those skilled in the art are contemplated for the present invention. For example, it is contemplated that satisfactory intimate mixtures may be obtained by prolonged mixing in low intensity powder blending equipment. Alternately, it is contemplated that an intimate mixture may be obtained by spray drying a solution of $NH_4VO_3$ and sublimation compound.

The synthesis reaction, step 2, is carried out in a conventional furnace. The reaction chamber in the furnace should be substantially gas tight apart from an inert gas inlet and a vent opening. Examples of suitable materials of construction for the reaction chamber are: stainless steel, nickel, aluminum and ceramic. The intimate blend of $NH_4VO_3$ and sublimation compound is placed in a substantially nonreactive open top container inside the furnace. The container can be formed from any suitable material such as, for example, stainless steel, nickel, aluminum and ceramic. Prior to heating, the furnace is purged with inert gas to substantially remove all oxygen. An inert gas flow preferably ranging from about 1 to about 3 cfm per Kg of blend is continued during the complete heating and cooling cycle. Nitrogen, helium and argon are examples of a suitable inert gases.

The furnace temperature is increased at a rate of about 0.1 to about 5.0° C./min. until a maximum temperature of approximately 250° C. to approximately 450° C., and most preferably approximately 440° C. is reached. This temperature is maintained for a period of about 4 hours after which heating is terminated and the furnace is allowed to cool to ambient temperature (step 3). The resulting $V_6O_{13}$ is removed from the furnace in step 4, after the furnace has cooled down to ambient temperature.

Gases are vented throughout the heating and cooling cycle. During heating, the sublimation compound sublimes and is removed from the furnace by the inert gas. Sublimation compound collects outside the vent opening on unheated surfaces and may be re-used in the current process.

The following examples are provided as an illustration of the present invention and are not intended to limit the invention claimed herein.

EXAMPLE 1

Synthesis of Sample A

A crucible with $NH_4VO_3$ was placed in a closed stainless reaction vessel. The reaction vessel was purged with nitrogen at a flow rate of about 140±40 liter $N_2$/hour. The reaction vessel was placed inside a furnace and the temperature was increased from ambient to 440° C. at a rate of 35° C./hour. The furnace was then cooled down to ambient temperature. Nitrogen flow was continued during the complete heating and cooling cycle. Sample A substantially represents the prior art $V_6O_{13}$.

Impurity levels of $NH_4VO_3$ (Kerr-McGee Chem. Corp.) used in these experiments are as follows:

| | |
|---|---|
| $SiO_2$ | <0.1% |
| Cl | <0.05% |
| $SO_4$ | <0.1% |
| Fe | <0.05% |
| Alkaline (as $Na_2O + K_2O$) | <0.2% |
| $H_2O$ insoluble compounds | <0.1% |

EXAMPLE 2

Synthesis of Sample B

Equal weights of 10 grams each of $NH_4VO_3$ and $NH_4Cl$ were mixed in a powder blender and dried in a vacuum oven at 90° C. under a vacuum of better than 1 torr for 3 hours. The dried mixture was ground in a ball mill for about 4 hours. The ground, intimate mixture containing 10 grams of $NH_4VO_3$ was placed in a crucible inside a closed stainless steel reaction vessel. The reaction vessel was continuously purged with nitrogen at a flow rate of about 140±40 liter $N_2$/hour. The reaction vessel was placed inside a furnace and the temperature was increased from ambient to 440° C. at a rate of 35° C./hour. The furnace was then cooled down to ambient temperature during the next 6 hours. Nitrogen flow was continued during the complete heating and cooling cycle. Ammonium chloride sublimed during heating of the mixture, it collected on an unheated zone outside the reaction vessel.

EXAMPLE 3

Synthesis of Sample C

Equal weights of $NH_4VO_3$ and ammonium benzoate ($NH_4C_7H_5O_2$) were mixed intimately. The mixture was placed in an open top stainless steel container inside a furnace. The temperature was increased at a rate of 0.5° C./min. to a temperature of 190° C. The temperature was maintained at 190° C. during 4 hours, and was then raised to 440° C. The furnace was kept at 440° C. for 4 hours, and was then allowed to cool down to ambient temperature at which point the sample was removed. A nitrogen gas flow was maintained through the furnace during heating and cooling. Ammonium benzoate collected on a cold zone of the furnace during heating of the mixture of $NH_4VO_3$ and ammonium benzoate.

EXAMPLE 4

Comparison of Samples A, B & C

|  | Sample A (prior art) | Sample B (using $NH_4Cl$) | Sample C (using $NH_4C_7H_5O_2$) |
| --- | --- | --- | --- |
| Composition | $V_6O_{13.0-13.2}$ | $V_6O_{14.05}$ | $V_6O_{13.35}$ |
| Bulk Density (g/ml) | 0.8–0.9 | 0.05–0.07 | 0.2–0.3 |
| BET surface area (m²/g) | 10–13 | 3.5–4.5 | approx. 33 |
| X-ray diffractogram | major peaks at 10.76, 3.63, 3.30, 2.92, 2.75, 2.18 and 1.98 angstrom d spacing | major peaks at 3.51, 3.32, 2.96, 2.67 angstrom d spacing | major peaks at 3.51, 2.96, 2.66., 2.01 and 1.85 angstrom d spacing |
| Agglomerate size and shape | irregular shape 20–50 μm | non-agglomerate | non-agglomerate |
| Primary crystal size and shape | short, rod-like, 0.5 × 3 μm | needle-like, 1 × 15 μm | needle-like 0.1 × 2 μm |

Figure 3:
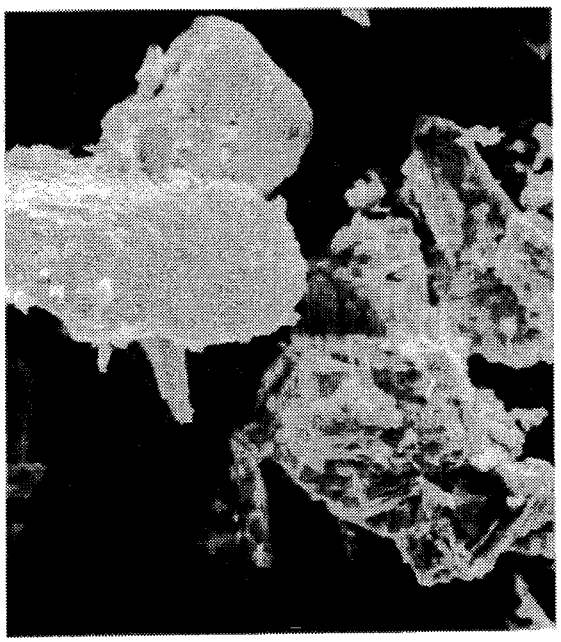
FIG. 3 is an SEM micrograph, at a magnification of 2,000, of $V_6O_{13}$ prepared according to a prior art process.
Figure 4:
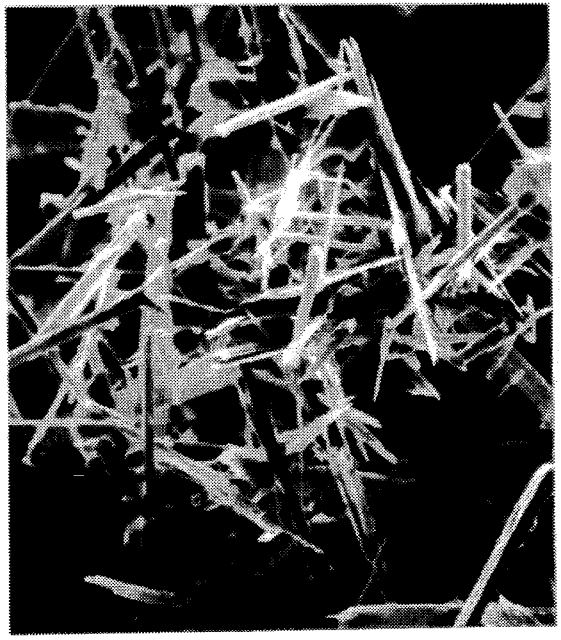
FIG. 4 is an SEM micrograph, at a magnification of 2,000, of novel $V_6O_{13}$ prepared by thermal decomposition of $NH_4VO_3$ in the presence of $NH_4Cl$.
Figure 5:
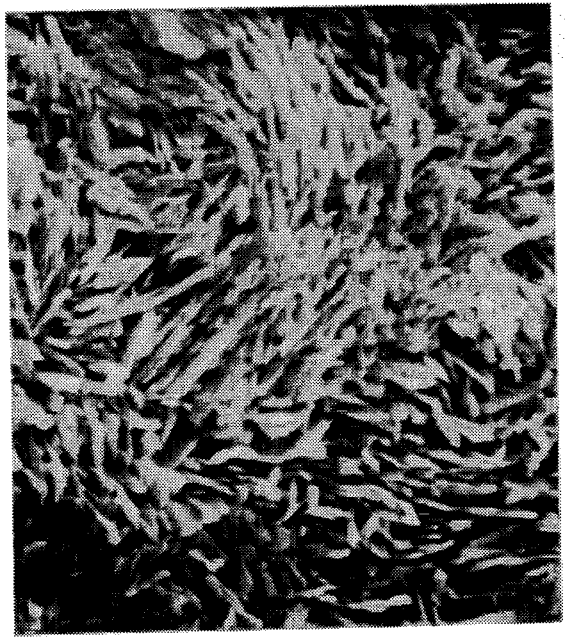
FIG. 5 is an SEM micrograph, at 10,000× magnification, of $V_6O_{13}$ prepared according to a prior art process.
Figure 6:
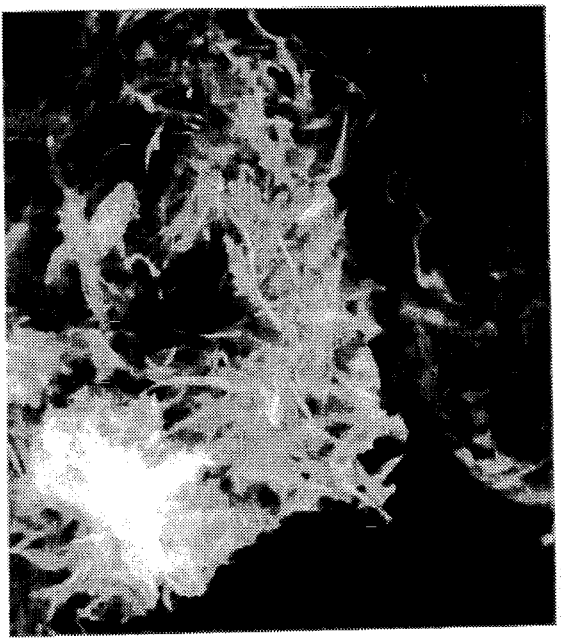
FIG. 6 is an SEM micrograph, at 10,000× magnification, of novel $V_6O_{13}$ prepared by thermal decomposition of $NH_4VO_3$ in the presence of $NH_4C_7H_5O_2$.

A visual comparison between samples A, B and C is provided in SEM micrographs FIGS. 3 through 6. FIGS. 3 and 4 show samples A and B respectively at a magnification of 2,000. FIGS. 5 and 6 show samples A and C, respectively, at 10,000× magnification. These micrographs demonstrate the pronounced filament-like morphology of the novel $V_6O_{13}$ (FIGS. 4 and 6), as compared with prior art $V_6O_{13}$ which has a predominant agglomerate structure (FIGS. 3 and 5).

Stoichiometric ratio of $V_6O_x$

Vanadium oxide samples made according to the present invention were found to have compositions with the following stoichiometric ratios: $V_6O_{13.35-14.05}$. Additionally, it is believed that $V_6O_{13.0-14.5}$ ratios are attainable according to the present invention.

Figure 2:
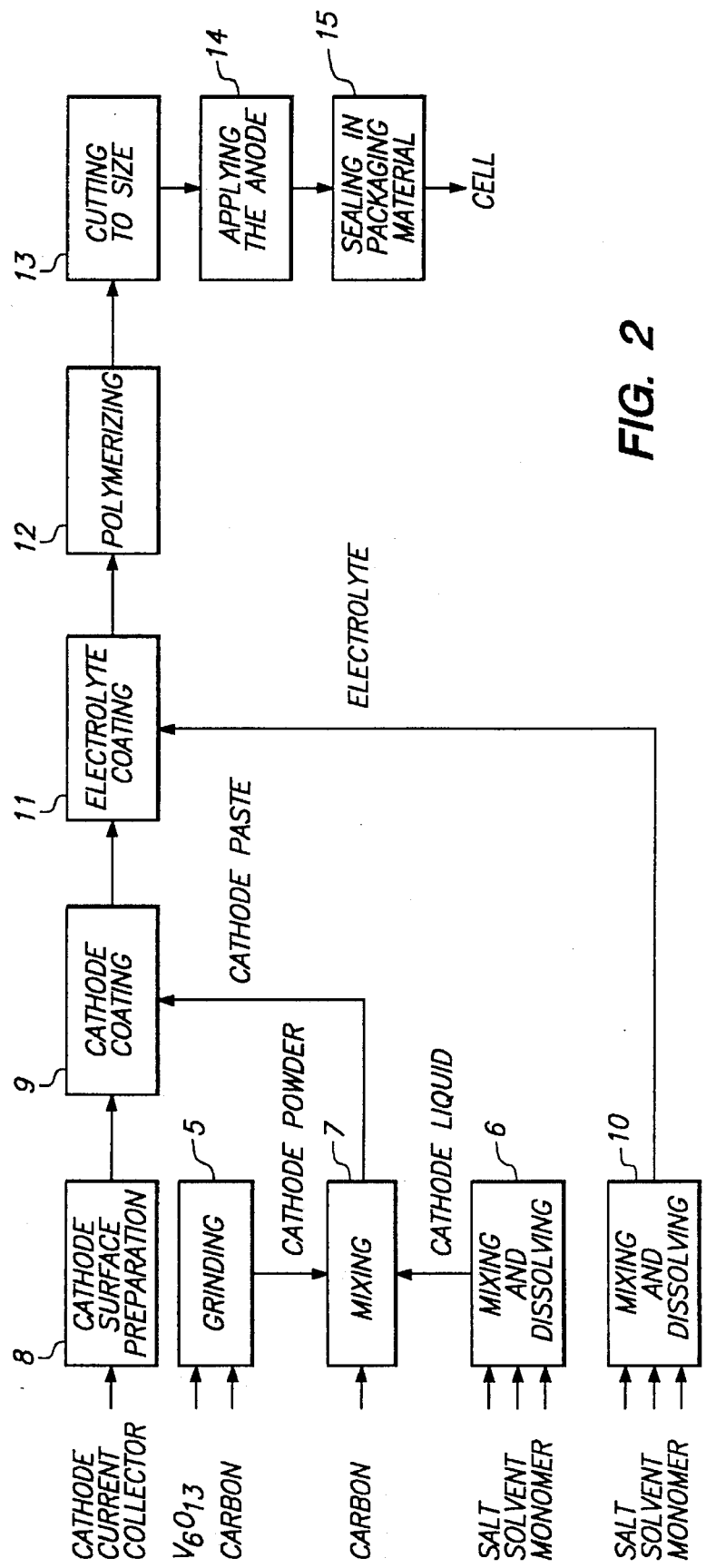
FIG. 2 is a flow sheet illustrating the process for making a solid state rechargeable electrochemical cell in which the novel $V_6O_{13}$ is utilized in the cathode.

II. Process for Producing Solid State Rechargeable Electrochemical Cells Containing Filament-Like $V_6O_{13}$ A process for producing solid state electrochemical cells utilizing novel $V_6O_{13}$ is illustrated in FIG. 2, wherein each number denotes a specific processing step.

A cathode paste is prepared in process steps 5 through 7. The cathode paste comprises novel filament-like $V_6O_{13}$, electronically conductive solid particles, ionically conductive salt solution in an aprotic solvent, and polymerizable monomer. The electronically conductive particles may comprise conductive carbon black, graphite or conductive polymer. Conductive carbon black powder has been found to be particularly effective in the instant invention, examples of commercial grades are: Shawinigan black, Ketjen black, Super S and Vulcan XC-72. U.S. Pat. No. 4,935,317 (Fauteux et al., 1990), which is hereby incorporated by reference, discloses that the optimum ratio of carbon to $V_6O_{13}$ will vary with particle size and processing or grinding techniques used. Fauteux '317 teaches that a suitable ratio of $V_6O_{13}$ to carbon is between 5/1 and 10/1, while the preferred ratio is about 10/1.

Additionally, it has been found that cathode paste with superior electronic conductivity may be obtained by mixing and grinding all the required $V_6O_{13}$ with only part of the required conductive carbon (step 5). The balance of the carbon is added and mixed together with the other cathode paste ingredients in step 7. It is thought that carbon which is ground with $V_6O_{13}$ provides a conductive coating of carbon on the $V_6O_{13}$ particles, the addition of carbon in step 7 provides electronic conductivity in the polymer matrix through the loosely held aggregates of carbon. Equipment suitable for this process step is similar to equipment for use in step 1.

Cathode paste ionic conductivity may be obtained by using conductive salt solution or conductive polymer to prepare the electrolyte. Fauteux '317 discloses many ionizable alkali metal, alkaline earth and ammonium salts which are suitable conductive salts. Lithium salts are particularly preferred. Fauteux teaches that suitable aprotic solvents to dissolve the salt should have low volatility. Typically, suitable solvents have a boiling point greater than 80° C. Examples of suitable solvents are polyethylene glycol dimethyl ether (PEGDME) and propylene carbonate. Accordingly, in step 6 conductive salt and aprotic solvent are mixed in a salt/solvent weight ratio range of about 1/9 to about 1/2 to completely dissolve the salt in the solvent.

Polymerizable monomer useful in the electrolyte compositions may yield either a conductive or a non-conductive matrix. Fauteux '317 discloses that preferred monomers are polyethylenically unsaturated compounds having at least one, and preferably a plurality of heteroatoms (particularly oxygen and/or nitrogen atoms) capable of forming donor acceptor bonds with alkali metal cation and which are terminated by polymerizable moieties. Upon polymerization, these compounds yield a conductive supportive matrix. Preferred polymerizable compounds are obtained by reacting a polyethylene glycol with acrylic or methacrylic acid. Examples of suitable polymers resulting in a non-conductive supportive matrix are acrylated epoxies, polyester acrylates and N-vinylpyrrolidone.

Accordingly in step 6, the conductive salt solution is mixed with polymerizable monomer in the following preferred weight ratio range of salt solution/monomer of about 1/1 to about 4/1. Conventional liquid mixing equipment is suitable for step 6. While the composition of the mixture prepared in step 6 is illustrated using a salt solution mixed with a monomer, a preferred alternate composition of the mixture consists of a solution of a polymerizable monomer (e.g., polyethylene oxide) in an aprotic solvent (e.g., propylene carbonate).

Alternately, U.S. Pat. No. 5,217,827 (Fauteux et al., 1993), incorporated herein by reference, discloses improved electrolyte compositions for solid state electrochemical cells comprising at least 65% by weight of a plasticizer such as an aprotic solvent. These compositions are particularly suitable for the manufacture of very thin cells.

Also, cells with improved stability and resistance to volatization or migration of the liquid components may be obtained by utilizing solid electrolyte having solvent ligands and polymer ligands coordinated with metal ions, as disclosed in U.S. Pat. No. 5,229,225 (Shackle, 1993) which is hereby incorporated by reference.

Step 7 involves mixing the ground mixture of $V_6O_{13}$ and conductive particles with the mixture of salt solution and monomer, and additional conductive particles to obtain the non-polymerized cathode paste. Examples of suitable mixing equipment for this process step are: change-can paste mixers and double-arm kneader mixers. The percentage of $V_6O_{13}$ in the cathode paste ranges from 25% to 75%, preferably 45% to 65%, see Fauteux '317.

Additionally, cathode coating compositions with good coating characteristics may be obtained by the addition of dispersing agents, e.g., lecithin, to the cathode paste. See, e.g., U.S. Pat. No. 4,830,939 (Lee et al., 1989) which is hereby incorporated by reference.

The cathode paste may be formed into a sheet and polymerized to thus form the cathode. More typically, however, the paste is coated on a cathode current collector which provides electrical conductivity and mechanical support. The current collector may consist of a sheet or foil of copper, aluminum, nickel or stainless steel. The surface of the current collector may be specially prepared, step 8, by microroughening for improved adhesion between the current collector and the cathode composition. See, e.g., Fauteux '317. Alternately, the current collector may first be coated with an electronically conductive polymeric compound. See, e.g., U.S. Pat. No. 5,252,254 (Koksbang et al., 1993) which is herein incorporated by reference.

The cathode paste obtained in step 7 is coated onto the current collector in step 9 by conventional coating techniques as taught by Fauteux '317.

The cathode paste coating deposited on the current collector may be polymerized immediately following step 9, more preferably the cathode coating is polymerized together with the electrolyte coating as will be described in step 12.

Cathode compositions of solid state rechargeable electrochemical cells commonly are made ionically conductive through the use of an electrolyte solution within a polymeric network. Alternately, cathode ionic conductivity may be obtained by using a conductive polymer film. Sec, e.g., U.S. Pat. No. 4,824,745 (Ogawa et al., 1989).

A solid electrolyte separator is prepared in step 11. This separator provides an ionically conductive and electronically non-conductive layer between the cathode and the anode. The mixture of polymerizable monomer, and solution of ionizable salt in aprotic solvent prepared in step 10 is coated on the cathode coating prepared in step 9. The electrolyte coating process is similar to the cathode coating process used in step 9.

The electrolyte coating applied in step 11 and the cathode coating applied in step 9 are polymerized in process step 12.

The type of polymerization depends on the type of monomer which is used in steps 6 and 10. Radiation polymerizable monomers which are polymerized using electron beam radiation are provided in Fauteux '317. Heat polymerizable monomers using thermal initiators are disclosed in U.S. Pat. No. 4,792,504 (Schwab et al., 1988), which is incorporated herein by reference.

The polymerized cathode and electrolytic separator is cut to a size suitable for an electrochemical cell in step 13.

Alkali metal sheet or foil is used as the anode. The preferred alkali metal is lithium which may be used as a foil or as a lithium coated foil such as nickel or copper foil, see Fauteux '317. The metal foil is placed on the electrolyte coating in step 14. Desirably, pressure is applied to the metal foil to obtain good contact between the anode and the solid electrolyte separator. Following application of the anode, terminals are attached to the anode and the cathode and the cell is sealed in gas and liquid impervious packaging material from which the electrodes protrude (step 15). Terminals may be secured to the anode and cathode by any desired technique which provides secure fastening and electrical contact, including adhesive bonding, welding, soldering and clamping.

Figure 7:
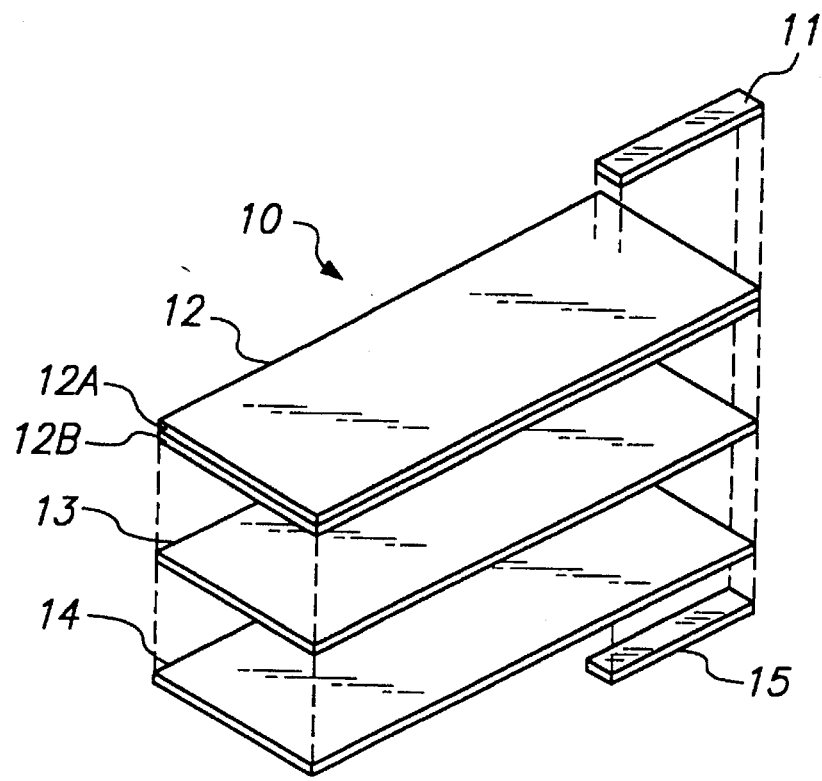
FIG. 7 is an exploded perspective view of a solid state electrochemical cell.

The structure of the cell 10, prepared in step 15 is illustrated in FIG. 7. Cell 10 includes a cathode terminal 11, a composite cathode 12, consisting of a cathode current collector 12A and a polymer cathode compound 12B, a solid electrolyte separator 13, an anode 14 and an anode terminal 15.

Figure 8:
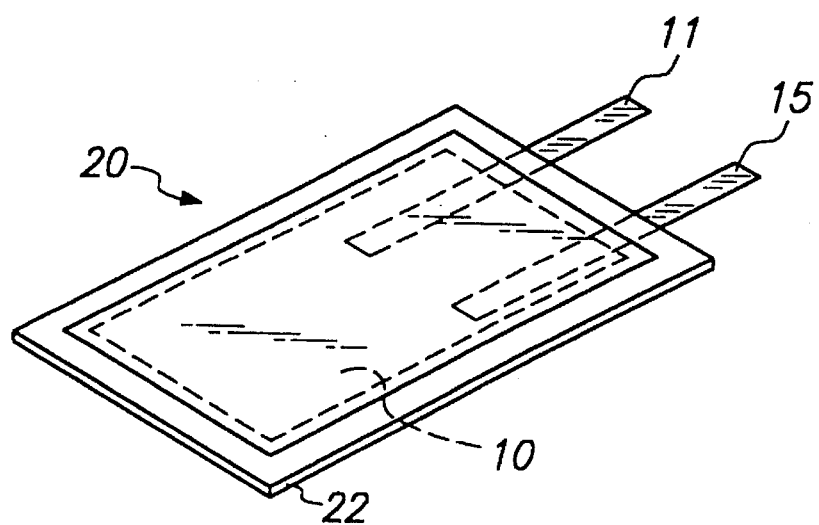
FIG. 8 is a perspective view of a sealed solid state electrochemical cell.

Sealed cell 20 is illustrated in FIG. 8. Cell 20 includes a solid state cell 10, shown in phantom, sealed within a gas and liquid impervious packaging material 22 from which terminals 11 and 15 protrude. Typically, a cell is sealed within a multilayered packaging material. See, e.g., U.S. Pat. No. 4,997,732 (Austin et al., 1991) which is hereby incorporated by reference, for typical packaging materials and sealing techniques.

A number of cells each consisting of a cathode, an electrolyte separator and an anode may be connected in series or in parallel within one sealed enclosure. See, e.g., Austin '732. The physical shape of a cell may be substantially flat as taught by Austin '732. Alternately, U.S. Pat. No. 4,879,190 (Lundsgaard, 1989) discloses jelly roll and fan folded stack cell configurations.

FIG. 2 illustrates a process for utilizing novel $V_6O_{13}$ in solid state rechargeable electrochemical cells. Alternately, novel $V_6O_{13}$ according to the present invention can be used as a cathode material in liquid electrochemical cells.

EXAMPLE 5

Preparation of a Cathode

A cathode is prepared using novel $V_6O_{13}$ according to the process illustrated in FIG. 2.

Step 5: Mix 45 g of novel $V_6O_{13}$ with 5 g of conductive carbon black (Shawinigan black) and grind in an attritor.

Step 6: Disperse 3 g of polyethylene oxide in 56 g of propylene carbonate and 14 g of triglyme. Stir the liquid at 65° C. until substantially complete solution of polyethylene oxide. Cool the solution to ambient temperature., then add and dissolve 11 g of $LiPF_6$ in the above solution. Finally, mix 84 g of the above $LiPF_6$ salt solution with 16 g of urethane acrylate monomer.

Step 7: Mix 50 g of ground powder mix prepared in step 7 with 45 g of the solution prepared in step 8 and 5 g of conductive carbon black (e.g., Shawinigan black).

Step 8: Coat an approximately 12–25 micron thick aluminum foil cathode current collector with a mixture of 25% conductive carbon black (e.g., Shawinigan black), 25% polyacrylic acid, 25% isopropanol and 25% water. Dry the coating. The final thickness of the conductive polymeric coating is approximately 2 microns.

Step 9: Apply an approximately 75 micron coating of the mixture prepared in step 7 to the coated surface of the current collector prepared in step 8. Polymerize the cathode coating by electron beam exposure at 6–9 Mrad.

It is believed that the filament-like morphology of the present invention may provide improved electronic conductivity as compared with prior art $V_6O_{13}$. It is now thought that conductive carbon particles in the composite cathode provide a substantial conductivity path when these particles are concentrated along the surface of $V_6O_{13}$. It is believed that filament particles of novel $V_6O_{13}$, when coated with conductive particles, may provide a more favorable electrical conductivity path through the cathode polymer matrix than prior art because of the latter's substantially agglomerate structure.

Having described the invention in detail and by reference to preferred embodiments thereof, it will be apparent to those skilled in the art that modifications and variations are possible without departing from the scope of the invention defined in the claims.

We claim:

1. A method for synthesizing vanadium oxide comprising the steps of: preparing a mixture of an ammonium vanadate and a sublimation compound which sublimes upon heating; heating the mixture in an inert gas flow, to a temperature to sublime said compound and to thermally decompose the ammonium vanadate, to form a vanadium oxide product; and cooling the product to ambient temperature in an inert gas atmosphere.

2. The method according to claim 1 wherein the ammonium vanadate is ammonium metavanadate.

3. The method according to claim 1 wherein the sublimation compound is selected from the group consisting of compounds which have a sublimation temperature of about 130° to about 550° C.

4. The method according to claim 3 wherein the sublimation compound is selected from the group consisting of ammonium chloride, ammonium bromide, ammonium acetate, ammonium benzoate, ammonium propionate, and ammonium formate.

5. The method according to claim 4 wherein the sublimation compound is selected from the group consisting of ammonium benzoate and ammonium chloride.

6. The method according to claim 1 wherein the inert gas is selected from the group consisting of nitrogen, argon and helium.

7. The method according to claim 1 wherein the weight ratio of the ammonium vanadate to the sublimation compound ranges from about 1/9 to about 9/1.

8. The method according to claim 1 wherein the weight ratio of the ammonium vanadate to the sublimation compound ranges from about 4/6 to about 9/4.

9. The method according to claim 1 wherein the mixture is heated to a maximum temperature of about 250° to about 450° C.

10. The method according to claim 1 further comprising a heating rate between 0.1° and 5.0° C. per minute.

11. The method according to claim 1 wherein the mixture is prepared by blending a powdered form of the ammonium vanadate and a powdered form of the sublimation compound.

12. The method according to claim 1 wherein the mixture is prepared by grinding the ammonium vanadate together with the sublimation compound.

13. The method according to claim 1 wherein the mixture is prepared by making a solution of the ammonium vanadate and the sublimation compound and spray drying the solution.

14. The method according to claim 1 wherein the sublimation compound is substantially removed from the mixture by sublimation during thermal decomposition of the ammonium vanadate.

15. A vanadium oxide which is characterized by a fiber structure and having a composition $V_6O_x$ wherein X is between about 13.35 and about 14.05, which is prepared by a method comprising the steps of: preparing a mixture of an ammonium vanadate and a sublimation compound which sublimes upon heating; heating the mixture in an inert gas flow, to a temperature to sublime said compound and to thermally decompose the ammonium vanadate, to form a vanadium oxide product; and cooling the product to ambient temperature in an inert gas atmosphere.

16. A vanadium oxide according to claim 15 which has a bulk density ranging from about 0.05 g/ml to about 0.3 g/ml.

17. A cathode for use in a rechargeable electrochemical cell wherein a cathode active material is a vanadium oxide which is characterized by a fiber structure having a composition $V_6O_x$ wherein X is between about 13.35 and about 14.05, which is prepared by a method comprising the steps of: preparing a mixture of an ammonium vanadate and a sublimation compound which sublimes upon heating; heating the mixture in an inert gas flow, to a temperature to sublime said compound and to thermally decompose the ammonium vanadate, to form a vanadium oxide product; and cooling the product to ambient temperature in an inert gas atmosphere.

18. The cathode according to claim 17 further comprising:

an electronically conductive powder compound;

an ionically conductive polymeric composition comprising a polymer and a solution of a conductive salt in an aprotic solvent; and a current collector.

19. A rechargeable electrochemical cell containing a cathode and an anode wherein a cathode active material is a vanadium oxide which is characterized by a fiber structure having a composition $V_6O_x$ wherein X is between 13.35 and 14.05, which is prepared by a method comprising the steps of: preparing a mixture of an ammonium vanadate and a sublimation compound which sublimes upon heating; heating the mixture in an inert gas flow, to a temperature to sublime said compound and to thermally decompose the ammonium vanadate, to form a vanadium oxide product; and cooling the product to ambient temperature in an inert gas atmosphere.

20. A rechargeable electrochemical cell according to claim 19 further comprising:

a solid state electrolytic separator comprising an ionically conductive polymeric composition; and wherein said anode is an alkali metal anode.

21. A rechargeable electrochemical cell according to claim 20 wherein the anode is selected from the group consisting of lithium, lithium alloy and lithium foil deposited on a metal selected from the group consisting of copper and nickel.

* * * * *